No. 878,881. PATENTED FEB. 11, 1908.
G. E. HOPKINS.
NAIL POLISHER.
APPLICATION FILED OCT. 10, 1906.

Inventor
George E. Hopkins.

Witnesses

By
Attorneys

UNITED STATES PATENT OFFICE.

GEORGE E. HOPKINS, OF ALTON, ILLINOIS.

NAIL-POLISHER.

No. 878,881.　　　　Specification of Letters Patent.　　　　Patented Feb. 11, 1908.

Application filed October 10, 1906. Serial No. 338,311.

*To all whom it may concern:*

Be it known that I, GEORGE E. HOPKINS, a citizen of the United States, residing at Alton, in the county of Madison and State of Illinois, have invented a new and useful Improvement in Nail-Polishers, of which the following is a specification.

This invention relates generally to manicuring devices and more particularly to a nail polisher, the object being to provide a novel form of handle whereby the polishing operation can be facilitated, and with this object in view the invention consists essentially in constructing the handle with a central depression adapted to receive one or more fingers, each end of the handle being constructed with overhanging extensions beneath which the fore and little finger are adapted to be inserted, thereby affording a firm hold upon the polisher.

The invention consists also in certain details hereinafter fully explained and pointed out in the claims.

Figure 1:
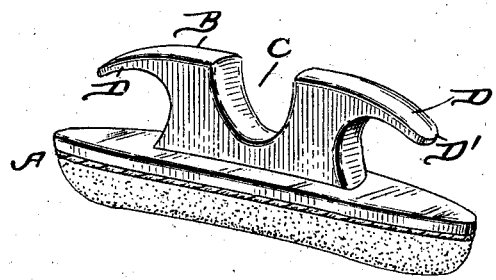
Figure 2:
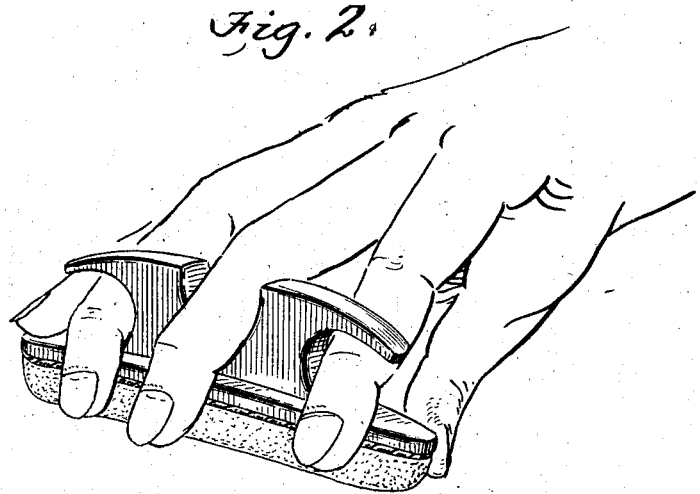
Figure 3:
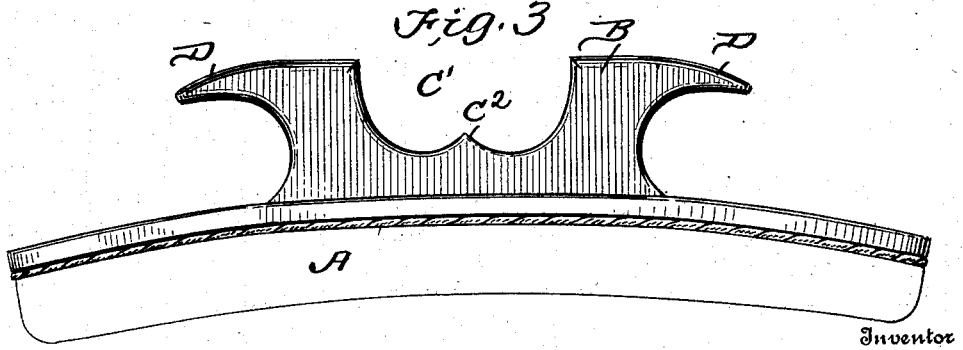

In the drawings forming part of this specification—Figure 1 is a perspective view of a nail polisher constructed in accordance with my invention; Fig. 2 is a view showing the manner of using the same; Fig. 3 shows a slightly modified form of handle.

Referring to the drawings, A indicates the usual construction of polisher and B the handle which is attached to the back of the polisher. This handle B has a central depression or cut out portion C and at each end the handle is provided with projections or extensions D which projections or extensions are curved toward the back of the polisher and the ends are cut away or curved as shown at D' so the fingers can be easily inserted between the back of the polisher and the curved projecting ends of the handle. In use the middle finger is inserted in the central recess or depression and the other fingers inserted beneath the projecting ends of the handle and a firm hold is thereby obtained upon the polisher, as shown in Fig. 2.

In Fig. 3 I have shown a slightly modified form of handle in which the depression or cut out portion C' is made somewhat larger and is constructed with a central subdividing ridge $C^2$. This form of handle being particularly adapted for use in connection with the larger polishers as it enables the middle and ring fingers to be inserted in the central depressions and the fore-finger and little finger inserted beneath the end extensions.

A polisher provided with a handle constructed as herein shown and described can be manipulated much more conveniently than one in which the handle is gripped between the thumb and fingers.

Having thus described my invention what I claim as new and desire to secure by Letters Patent is—

A nail polisher provided with a handle on its back, having outwardly and downwardly extending ends curved to fit the fingers and a recess formed in the central portion of the top of the handle adapted to receive the middle fingers whereby the handle can be securely held between the fingers and the polishing operation facilitated.

GEORGE E. HOPKINS.

Witnesses:
　JEWETT E. SMITH,
　ANNE C. HOPKINS.